(12) United States Patent
Ohmori

(10) Patent No.: US 11,489,187 B2
(45) Date of Patent: Nov. 1, 2022

(54) CELL STACK DEVICE

(71) Applicant: NGK INSULATORS, LTD., Nagoya (JP)

(72) Inventor: Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 174 days.

(21) Appl. No.: 16/593,252

(22) Filed: Oct. 4, 2019

(65) Prior Publication Data
US 2020/0036027 A1 Jan. 30, 2020

Related U.S. Application Data

(63) Continuation of application No. PCT/JP2019/016492, filed on Apr. 17, 2019.

(30) Foreign Application Priority Data

Jun. 6, 2018 (JP) .............................. JP2018-108385

(51) Int. Cl.
*H01M 8/12* (2016.01)
*H01M 8/0247* (2016.01)
(Continued)

(52) U.S. Cl.
CPC ........... *H01M 8/12* (2013.01); *H01M 8/0247* (2013.01); *H01M 4/905* (2013.01); *H01M 4/9025* (2013.01); *H01M 4/9033* (2013.01); *H01M 8/24* (2013.01); *H01M 8/241* (2013.01); *H01M 8/2432* (2016.02); *H01M 2008/1293* (2013.01)

(58) Field of Classification Search
None
See application file for complete search history.

(56) References Cited

U.S. PATENT DOCUMENTS

2006/0228613 A1* 10/2006 Bourgeois ........... H01M 8/0271
429/510
2006/0275649 A1* 12/2006 Keller ................. H01M 8/0297
429/457
(Continued)

FOREIGN PATENT DOCUMENTS

JP    H0878040 A    3/1996
JP    2010-15977 A    1/2010
(Continued)

OTHER PUBLICATIONS

English International Search Report for corresponding PCT/JP2019/016492, dated Jul. 16, 2019 (1 page).
(Continued)

*Primary Examiner* — Jeremiah R Smith
(74) *Attorney, Agent, or Firm* — Flynn Thiel, P.C.

(57) ABSTRACT

A cell stack device includes a fuel cell, a first separator and a first bonding member. The fuel cell includes a solid electrolyte and a cathode that is provided on one surface of the solid electrolyte. The first separator includes a protrusion that protrudes towards the cathode. The first bonding member bonds the cathode and the first protrusion. The thickness of a first bonding member that is positioned on an outer peripheral portion is greater than the thickness of a first bonding member that is positioned at a central portion.

8 Claims, 5 Drawing Sheets

(51) Int. Cl.
*H01M 8/2432* (2016.01)
*H01M 4/90* (2006.01)
*H01M 8/24* (2016.01)
*H01M 8/241* (2016.01)

(56) References Cited

U.S. PATENT DOCUMENTS

| | | | |
|---|---|---|---|
| 2009/0000732 A1* | 1/2009 | Jacobine | H01M 8/0267 |
| | | | 156/273.5 |
| 2009/0075125 A1* | 3/2009 | Gottmann | H01M 4/9033 |
| | | | 429/529 |
| 2009/0169940 A1 | 7/2009 | Ohmori et al. | |
| 2009/0297906 A1 | 12/2009 | Harada | |
| 2010/0167164 A1* | 7/2010 | Reilly | H01M 4/8889 |
| | | | 429/485 |
| 2010/0178589 A1* | 7/2010 | Kwon | H01M 8/2457 |
| | | | 429/507 |
| 2010/0190066 A1* | 7/2010 | Oh | H01M 8/0297 |
| | | | 429/405 |
| 2011/0269054 A1* | 11/2011 | Hasz | H01M 8/0282 |
| | | | 429/479 |
| 2013/0137014 A1* | 5/2013 | Lin | C04B 35/488 |
| | | | 429/510 |

FOREIGN PATENT DOCUMENTS

JP 5280173 B2 6/2010
JP 2013-069521 A 4/2013

OTHER PUBLICATIONS

English Translation of Written Opinion of the International Searching Authority issued in PCT/JP2019/016492, dated Jul. 16, 2019 (5 pages).

Japanese language International Search Report, Written Opinion, and Transmittal for the International Search Report and Written Opinion for PCT/JP2019/016492, dated Jul. 16, 2019 (8 pages).

* cited by examiner

CELL STACK DEVICE

CROSS-REFERENCE TO RELATED APPLICATIONS

This is a continuation of PCT/JP2019/016492, filed Apr. 17, 2019, which claims priority to Japanese Application No. 2018-108385, filed Jun. 6, 2018, the entire contents of which are hereby incorporated by reference.

TECHNICAL FIELD

The present invention relates to a cell stack device.

BACKGROUND ART

A cell stack device is known in which a plurality of fuel cells are alternately disposed with a plurality of separators (for example, reference is made Patent Literature 1). A fuel cell and a separator are interconnected through a bonding member.

CITATION LIST

Patent Literature

[Patent Literature 1] Japanese Patent No. 5280173

SUMMARY OF INVENTION

Problem to be Solved by the Invention

It is preferred that an electrical connection between a fuel cell and a separator is ensured by a bonding member. In that context, the problem of the present invention is the stabilization of the connection formed by a bonding member between a fuel cell and a separator.

Solution to Problem

A cell stack device according to an aspect of the present invention includes a fuel cell, a first separator and a first bonding member. The fuel cell includes a solid electrolyte and a cathode that is provided on one surface of the solid electrolyte. The first separator includes a plurality of protrusions that protrude towards the cathode. The first bonding member is a material that exhibits a conductivity. The first bonding member bonds the cathode and a first protrusion. The thickness of the first bonding member that is positioned on an outer peripheral portion is greater than the thickness of the first bonding member that is positioned in a central portion.

According to the above configuration, even during a thermal stress due to a temperature distribution produced during the operation of the cell stack device, or during a localized stress resulting from the deformation of the fuel cells, the large thickness of the first bonding member in an outer peripheral portion ensures the maintenance of the electrical connection on an outer peripheral portion between the cathode and the first bonding member. Consequently, it is possible to enhance the stability of the connection created by the first bonding member between the fuel cells and the first separator.

It is preferred that the fuel cell further includes an anode that is provided on another surface of the solid electrolyte, and that further includes a second separator including a plurality of second protrusions protruding towards the anode and a conductive second bonding member that bonds the anode and the plurality of second protrusions. The thickness of the second bonding members that are positioned in a central portion is greater than the second bonding members that are positioned in an outer peripheral portion.

According to the above configuration, the electrical connection of an outer peripheral portion is maintained in the cathode that is provided on one surface of the solid electrolyte and the electrical connection of a central portion is maintained in the anode that is provided on another surface of the solid electrolyte. Consequently, it is possible to further enhance the stability of the connection between the fuel cells and the separator.

It is preferred that each first bonding member is disposed at an interval.

A cell stack device according to another aspect of the present invention includes a fuel cell, a second separator and a second bonding member. The fuel cell includes a solid electrolyte and an anode that is provided on another surface of the solid electrolyte. The second separator includes a plurality of protrusions that protrude towards the anode. The second bonding member is configured from a conductive material. The second bonding member bonds the anode and a second protrusion. The thickness of the second bonding member that is positioned on a central portion is greater than the thickness of the second bonding member that is positioned in an outer peripheral portion.

According to the above configuration, even during a thermal stress due to a temperature distribution produced during the operation of the cell stack device, or during a localized stress resulting from deformation of the fuel cells, the large thickness of the second bonding member in a central portion ensures maintenance of the electrical connection on a central portion between the anode and the second bonding member. Consequently, it is possible to enhance the stability of the connection created by the second bonding member between the fuel cells and the second separator.

It is preferred that each second bonding member is disposed at an interval.

It is preferred that at least one of the first and the second bonding member is configured by a conductive ceramic. The thickness of the first bonding member may be different from the thickness of the second bonding member.

Advantageous Effects of Invention

The present invention enhances the stability of the connection created by a bonding member between the fuel cells and a separator.

DESCRIPTION OF EMBODIMENTS

An embodiment of the cell stack device according to the present invention will be described below making reference to the figure.

Figure 1:
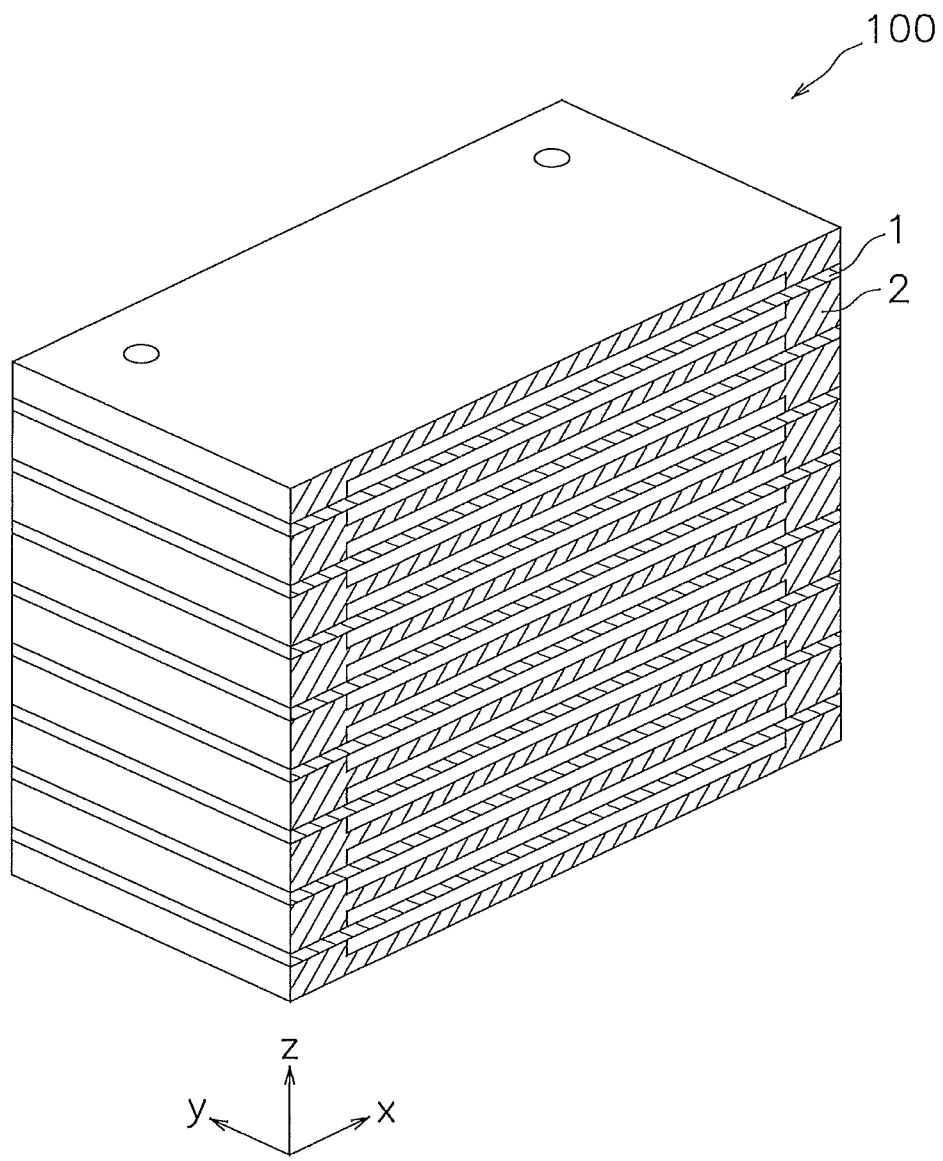
FIG. 1 is a perspective view of a cell stack device
Figure 2:
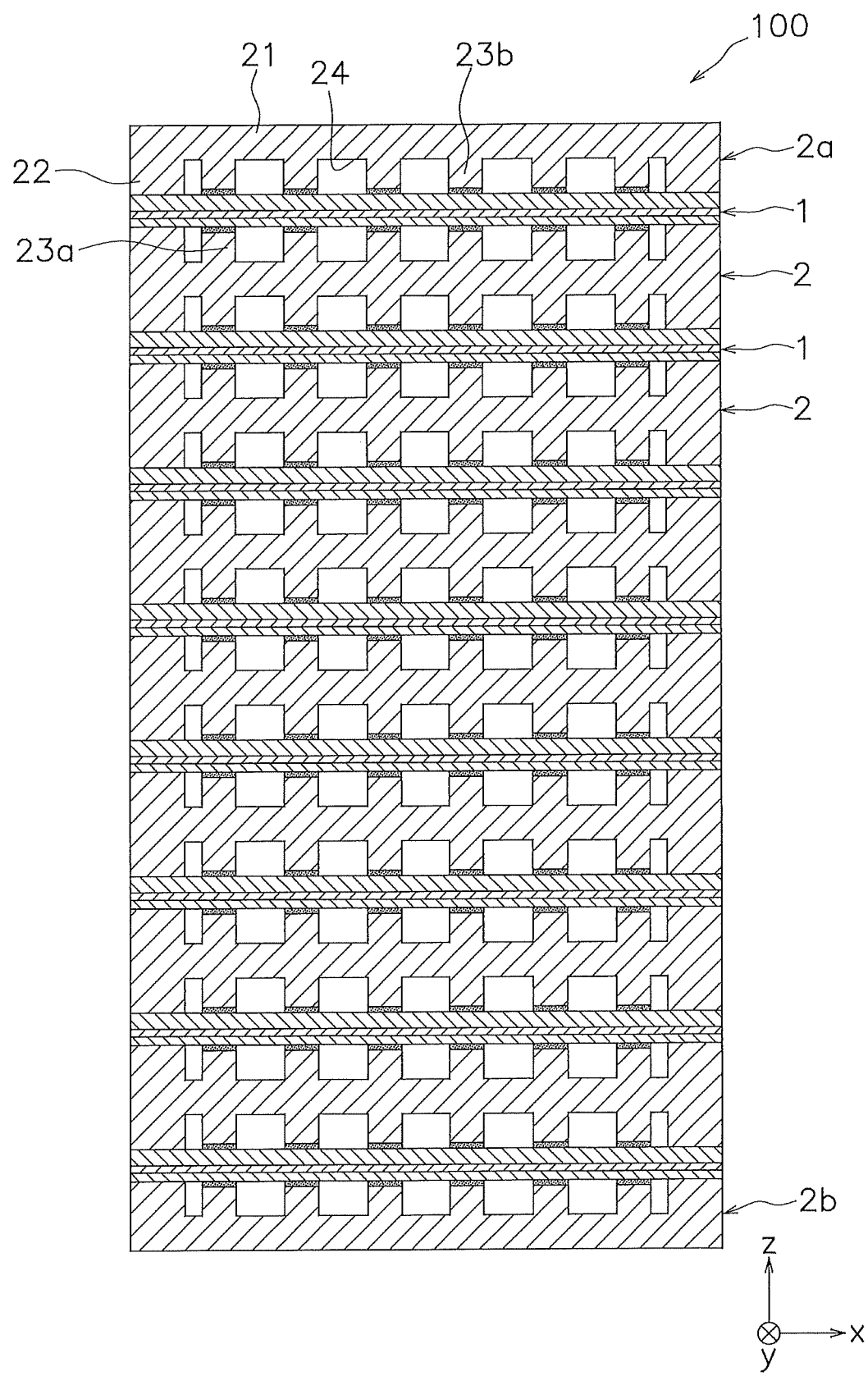
FIG. 2 is a sectional view of a cell stack device.

As shown by FIG. 1 and FIG. 2, the cell stack device 100 includes a plurality of fuel cells 1 and a plurality of separators 2. The cell stack device 100 has a structure in which the fuel cells 1 are stacked alternately with separators 2. That is to say, the cell stack device 100 has a so-called flat-plate cell stack structure.

Fuel Cell

Figure 3:
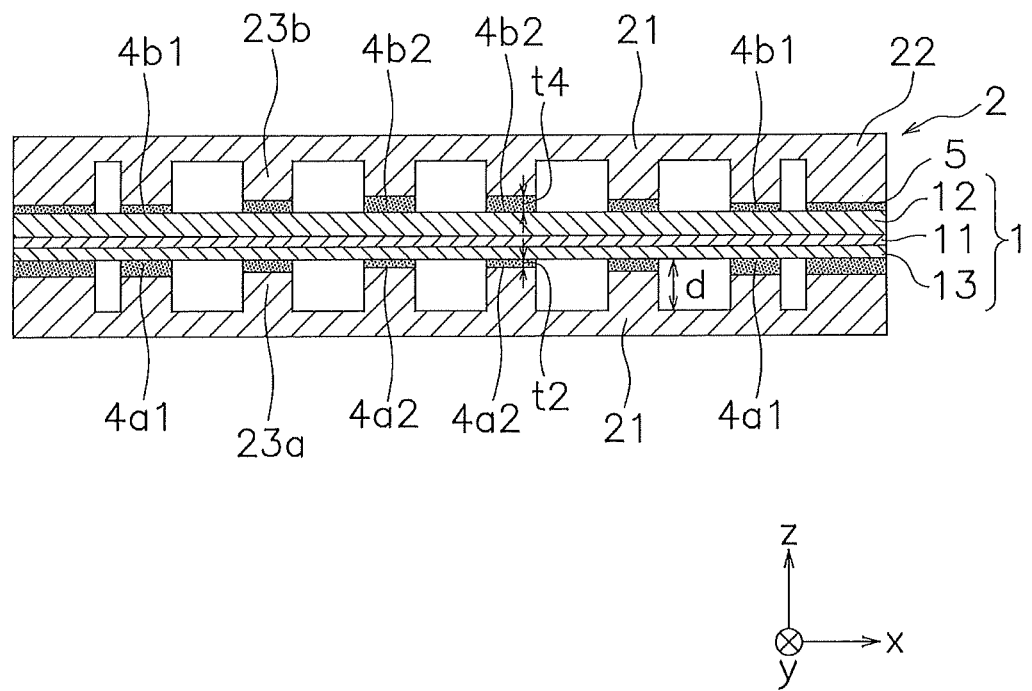
FIG. 3 is an enlarged sectional view of a cell stack device.

As shown in FIG. 3, the fuel cell 1 includes a solid electrolyte 11, an anode 12 and a cathode 13. The fuel cells 1 have a rectangular shape when viewed in plan (viewed along the Z axis). It is noted that the fuel cells 1 are configured as a solid oxide fuel cell.

The solid electrolyte 11 has a flat-plate shape, in which a main surface is oriented in a stacking direction (Z axis direction). The cathode 13 is disposed on one surface of the solid electrolyte 11. The anode 12 is disposed on another surface of the solid electrolyte 11. That is to say, the solid electrolyte 11 is sandwiched by the cathode 13 and the anode 12. It is noted that in this embodiment, the anode 12 is disposed on an upper surface of the solid electrolyte 11 and the cathode 13 is disposed on a lower surface of the solid electrolyte 11.

The thickness of the fuel cell 1 (dimension in the Z axis direction) is substantially equal along its entire length. For example, the thickness of the fuel cell 1 is about 110 to 2100 µm. The present embodiment discloses that the anode 12 is thicker than both the solid electrolyte 11 and the cathode 13. Consequently, the anode 12 is configured to support the solid electrolyte 11 and the cathode 13.

More specifically, the thickness of the anode 12 may be configured to be 50 to 2000 µm, the thickness of the solid electrolyte 11 may be configured as 1 to 50 µm, and the thickness of the cathode 13 may be configured as 50 to 200 µm.

The solid electrolyte 11 for example is configured by a dense material that contains YSZ. The anode 12 for example is configured by a porous material that contains Ni and YSZ. The cathode 13 for example is configured by a porous material that contains LSM (La(Sr)MnO$_3$:lanthanum strontium magnetite). The porosity of the anode 12 may be configured to about 15 to 55%, the porosity of the solid electrolyte 11 may be configured to about 0 to 10%, and the porosity of the cathode 13 may be configured to about 15 to 55%. The coefficient of thermal expansion of the anode 12 may be configured to be 11 to 13 ppm/K, the coefficient of thermal expansion of the solid electrolyte 11 may be configured to be 9 to 11 ppm/K, and the coefficient of thermal expansion of the cathode 13 may be configured to be 11 to 17 ppm/K.

Separator

As shown by FIG. 2 and FIG. 3, the separator 2 is disposed facing the fuel cell 1. When one fuel cell 1 is viewed in the center, the separator that is provided on one face of the cell 1 is named the first separator, and the separator that is provided on the other face of the cell 1 is named the second separator. The first separator 2 includes a flat plate portion 21, a pair of frame portions 22, and a first protrusion 23. The flat plate portion 21 and the pair of frame portions 22 are configured as a single member. It is noted that the flat plate portion 21 and the pair of frame portions 22 may be configured by separate members. When viewed in plan (viewed in the z axis direction), the shape of the first separator 2 is substantially the same as the shape of the fuel cell 1. It is noted that an upper end separator 2a that is disposed on an upper end of the cell stack device 100 and a lower end separator 2b that is disposed on a lower end may include a single frame portion 22 rather than a pair.

The frame portion 22 is disposed along the whole periphery of the peripheral edge portion of the flat plate portion 21. The frame portion 22 is configured in a circular manner. The frame portion 22 is configured to protrude in a direction of stacking (z axis direction) from both respective faces of the flat plate portion 22. That is to say, each frame portion 22 protrudes towards adjacent fuel cells 1. In the present embodiment, each frame portion 22 projects upwardly or downwardly.

It is noted that although the upper end separator 2a that is disposed on the upper end of the cell stack device 100 includes a frame portion 22 that protrudes downwardly, the frame portion that protrudes upwardly is omitted. On the other hand, the lower end separator 2b that is disposed on the lower end of the cell stack device 100 includes a frame portion 22 that protrudes upwardly, and the frame portion that protrudes downwardly is omitted.

The frame portion 22 of the first separator 2 presses on the peripheral edge portion of the cell 1. For example, the frame portion 22 and the cell 1 of the first separator 2 are bonded by a third bonding member 5 (glass material or the like).

A first protruding portion 23a protrudes from the flat plate portion 21 towards the cathode 13. The first protruding portion 23a is configured to electrically connect the fuel cell 1 and the flat plate portion 21. The first protruding portion 23a and the flat plate portion 21 are configured by a single member. It is noted that the first protruding portion 23a and the flat plate portion 21 may be configured by separate members.

A gas passage 24 is defined by the flat plate portion 21, the frame portion 22 and the first protruding portion 23a. A depth d of the gas passage 24 for example is about 0.1 to 5 mm. The gas passage 24 faces the fuel cell 1. The gas passage 24 facing the cathode 13 of the fuel cell 1 is supplied with a fuel gas.

A plurality of first protrusions 23a are provided. Each protrusion 23a is disposed at an interval. For example, each protrusion 23a is disposed at an interval in the x axial direction and extends in the y axis direction.

Figure 4:
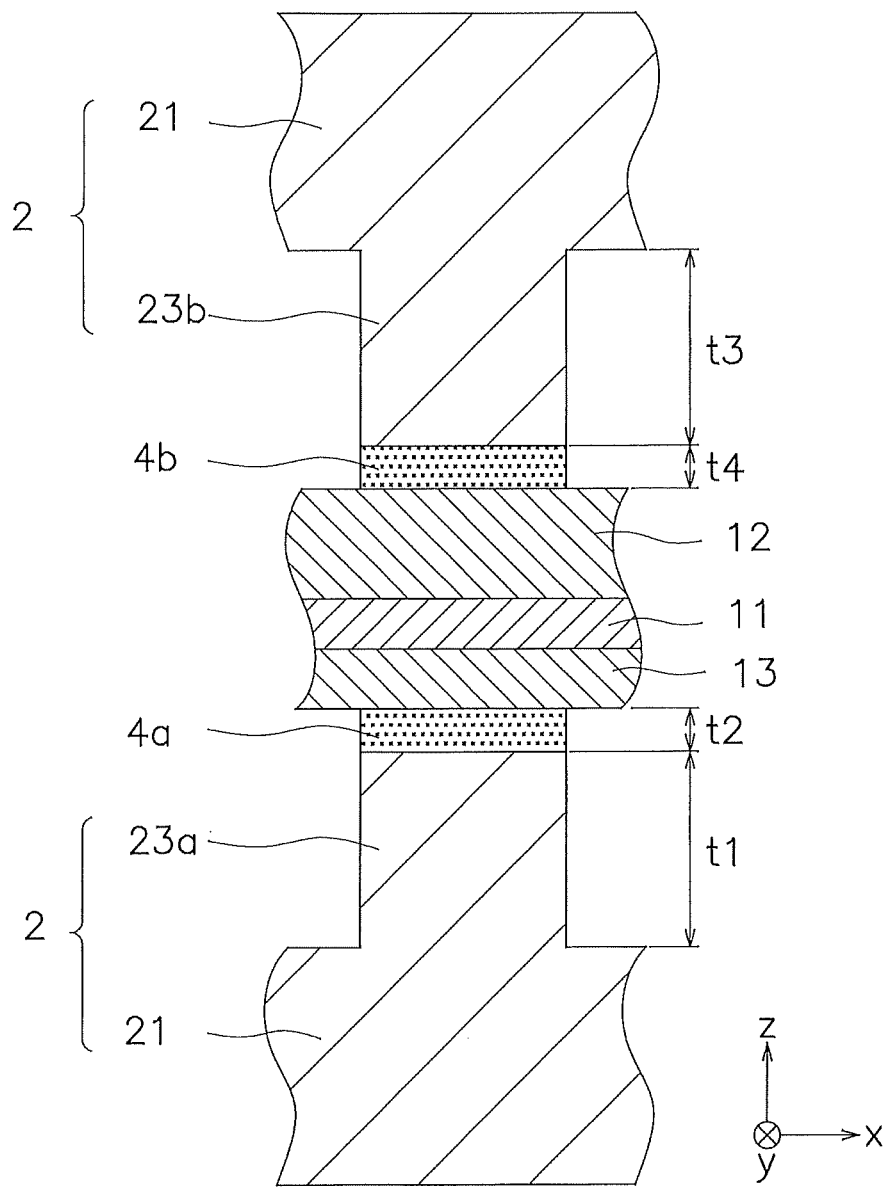
FIG. 4 is an enlarged sectional view illustrating the detailed structure of the bonding portion.

As shown in FIG. 4, the thickness t1 of the first protrusion 23a, for example, is preferably configured to be about 1.0 to 5.0 mm. It is noted that the thickness t1 of the first protrusion 23a refers to the dimension of the first protrusion 23a in the direction of stacking (z axis direction).

The separator 2 is configured by an Ni-based heat resistant alloy (for example, ferrite-based SUS, Inconel 600 and Hastelloy or the like). The coefficient of thermal expansion of the separator 2 for example may be configured to be 11 to 14 ppm/K.

The second separator includes a second protrusion 23b that protrudes towards the anode 12. The second separator is configured in the same manner as the first separator and therefore the description will be omitted.

Bonding Member

The cell stack device 100 further includes a bonding member that bonds the fuel cell 1 and the separator 2. The bonding member includes a first bonding member 4a and a second bonding member 4b. The first bonding member 4a bonds the cathode 13 and the first protrusion 23a. The second bonding member 4b bonds the anode 12 and the second protrusion 23b. A plurality of first bonding members 4a and second bonding members 4b are provided. For example, each bonding member 4a and 4b is disposed at an interval in the x axis direction.

As shown by FIG. 3, a thickness t2 of the first bonding member 4a1 that is positioned on an outer periphery of the fuel cell 1 is greater than a thickness t2 of the first bonding member 4a2 that is positioned at a central portion of the fuel cell 1. A thickness t2 of each first bonding member 4a preferably increases in a gradual manner from the center to the outer peripheral edge.

The thickness t2 of the first bonding member 4a1 of the outer peripheral portion is preferably configured, for example, to be about 0.1 to 0.5 mm. A thickness t2 of the first bonding member 4a2 in a central portion, for example, is preferably configured to be about 0.05 to 0.3 mm. A ratio of the thickness of the central portion first bonding member 4a2 to the thickness of the outer peripheral first bonding member 4a1 is preferably configured for example to be about 0.3 to 0.9.

The thickness t4 of the second bonding member 4b2 that is positioned on a central portion is greater than the thickness t4 of the second bonding member 4b1 that is positioned on an outer peripheral portion. A thickness t4 of each second bonding member 4b preferably increases in a gradual manner from the outer peripheral edge to the center.

The thickness t4 of the second bonding member 4b1 of the outer peripheral portion is preferably configured, for example, to be about 0.05 to 0.3 mm. A thickness t4 of the second bonding member 4b2 in a central portion, for example, is preferably configured to be about 0.1 to 0.5 mm. A ratio of the thickness of the second bonding member 4b2 of the outer peripheral portion to the thickness of the second bonding member 4b1 of the central portion is preferably configured, for example, to be about 0.3 to 0.9.

The bonding members 4a1 and 4b1 that are positioned on an outer peripheral portion denote bonding members that are in the most proximate position to the outer peripheral edge in a direction (x axis direction) of extension of the fuel cell in one layer. The bonding members 4a2 and 4b2 that are positioned at a central portion denote bonding members that are in the most proximate position to the center in a direction (x axis direction) of extension of the fuel cell in one layer.

The thickness t4 of the first bonding member 4a and the second bonding member 4b may be the same or may be different. In this context, the thickness t2 of the first bonding member 4a and the thickness t4 of the second bonding member 4b denote the dimension of each bonding member 4a and 4b in the direction of stacking (z axis direction). More specifically, an average value for the thickness of the bonding members 4a2 and 4b2 of the central portion and an average value for the thickness of the bonding members 4a1 and 4b1 of the outer peripheral portion are calculated in relation to each bonding member 4a and 4b when viewed in a cross section that crosses the cell stack device in a perpendicular plane that extends in the stacking direction and passes through each bonding member 4a and 4b. It is noted that the thickness of each bonding member 4a and 4b is not considered in the protruding portion of each bonding member 4a and 4b in an outer direction from the first and second protruding portions 23a and 23b. Furthermore, the thickness of the respective bonding members 4a and 4b when bonding has failed or is not completely bonded is not taken into account when calculating the average value.

The first bonding member 4a is connected with the whole of the surface facing the fuel cell 1 side of the first protrusion 23a. The contact surface area of the first bonding member 4a and the first protrusion 23a and the contact surface area of the second bonding member 4b and the second protrusion 23b are preferably about 1 to 50 mm². It is noted that when the protrusions 23a and 23b are configured by a plurality of members, it is preferred that the respective contact surface area of each protrusion 23a and 23b and each bonding member 4a and 4b fall within the ranges discussed above. However, a portion may fall outside those ranges.

The first bonding member 4a and the second bonding member 4b are configured by a conductive material, and are configured by an $(Mn,Co)_3O_4$-based conductive ceramic or a precious metal. More specifically, the first bonding member 4a and the second bonding member 4b are configured by at least one material selected from the group comprising $(Mn,Co)_3O_4$, $(La,Sr)(Co,Fe)O_3$, Pt, and Ag or the like. The second bonding member 4b that is bonded with the anode 12 is preferably comprised of a material that contains Ni. The first bonding member 4a that is bonded with the cathode 13 is preferably configured from a conductive ceramic.

The cell stack device 100 as configured above produces electrical power in the following manner. A fuel gas (hydrogen gas or the like) flows into the gas passage 24 that faces the anode 12 and air flows into the gas passage 24 that faces the cathode 13. When the cell stack device 100 is connected to an external load, an electrochemical reaction occurs at the cathode 13 as shown by Formula (1) below, an electrochemical reaction occurs at the anode 12 as shown by Formula (2) below, and a flow of current is created.

$$(½) \cdot O_2 + 2e^- \rightarrow O^{2-} \tag{1}$$

$$H_2 + O^{2-} \rightarrow H_2O + 2e^- \tag{2}$$

Method of Manufacture

Next, a method of manufacture of the cell ceramic device 100 configured as discussed above will be described. Firstly, a green sheet for the anode 12 of the fuel cell 1 is formed. Next, an electrolytic paste is coated onto the green sheet by the use of a screen printing method or the like, and fired to form a fired body. Next, a cathode paste is coated by screen printing or the like onto the fired body and fired. As a result, the fuel cell 1 is formed.

The separator 2, for example, is formed by the execution of a cutting and pressing treatment step or the like on a thin plate of a Ni-based heat resistant alloy or an Fe—Cr-based heat resistant alloy.

Next the completed fuel cell 1 is stacked alternately with a separator 2. It is noted that the first bonding member 4a is coated onto a surface that faces the cathode 13 for the first protrusion 23a of the separator 2 and the second bonding member 4b is coated onto a surface that faces the anode 12 for the second protrusion 23b of the separator 2. In this step, the respective first bonding members 4a are coated to thereby reduce the thickness of the central portion and increase the thickness of the outer peripheral portion. Furthermore, the respective second bonding members 4b are coated to thereby increase the thickness of the central portion and reduce the thickness of the outer peripheral portion.

A thermal treatment is executed in relation to this stacked body. For example, the thermal treatment temperature is 800 to 1100 degrees C. The thermal treatment time may be 1 to 10 hours. As a result, the stacked body is integrated as a result of the hardening of the respective bonding members to thereby complete the cell stack device 100 as shown in FIG. 1.

MODIFIED EXAMPLES

Although an embodiment of the present invention has been described, the present invention is not limited to the above embodiment and various modifications are possible within a scope that does not depart from the spirit of the invention. For example, in the above embodiment, although 6 first and second protrusions 23a and 23b are disposed in the respective gas passages 24, only 2 protrusions 23a and 23b may also be disposed in the respective gas passages 24. Furthermore, in the above embodiment, although a plurality of first and second protrusions 23a and 23b are disposed in the respective gas passages 24 in the x axis direction and y axis direction, they may be disposed only in the x axis direction or the y axis direction.

Furthermore, the first protrusion 23a may protrude toward the anode 12 and the second protrusion 23b may protrude toward the cathode 13.

Figure 5:
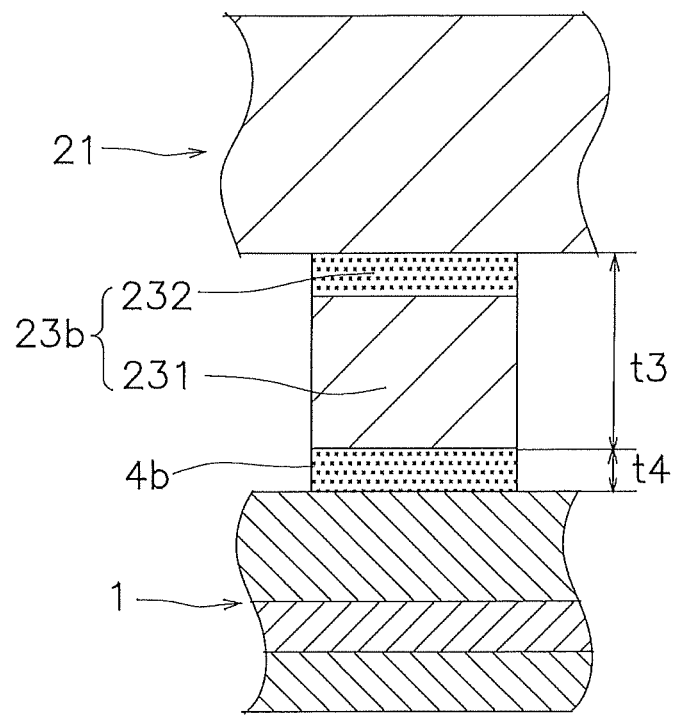
FIG. 5 is an enlarged sectional view illustrating a modified example of a bonding portion.

Furthermore, the first protrusion 23a and the second protrusion 23b may be configured by a plurality of stacked members. For example, as shown in FIG. 5, the second protrusion 23b may be configured by a current collecting member 231 and a fourth bonding member 232.

REFERENCE SIGNS LIST

1 FUEL CELL
2 SEPARATOR
4a FIRST BONDING MEMBER
4b SECOND BONDING MEMBER
100 CELL STACK DEVICE

The invention claimed is:

1. A cell stack device comprising
a fuel cell including a solid electrolyte and a cathode that is provided on one surface of the solid electrolyte,
a first separator including a plurality of first protrusions that protrude towards the cathode, and
a plurality of conductive first bonding members that bond a main surface of the cathode and the plurality of first protrusions, wherein:
a thickness of a conductive first bonding member that is positioned on an outer peripheral portion and bonds the main surface of the cathode is greater than a thickness of a conductive first bonding member that is positioned at a central portion and bonds the main surface of the cathode, and
each of the first bonding members is disposed at an interval.

2. The cell stack device according to claim 1, wherein the fuel cell further includes an anode provided on another surface of the solid electrolyte and the cell stack device further comprises
a second separator including a plurality of second protrusions that protrude towards the anode, and
a plurality of conductive second bonding members that bond the anode and the plurality of second protrusions, and
a thickness of a second bonding member that is positioned at a central portion is greater than a thickness of a second bonding member that is positioned at an outer peripheral portion.

3. The cell stack device according to claim 2, wherein at least one of the first and the second bonding members comprises a conductive ceramic.

4. The cell stack device according to claim 2, wherein the thickness of each second conductive bonding member gradually increases from the outer peripheral portion to the central portion.

5. The cell stack device according to claim 1, wherein the thickness of each first conductive bonding member gradually increases from the central portion to the outer peripheral portion.

6. The cell stack device according to claim 1, wherein a conductive first bonding member is provided on the entire tip surface of each first protrusion.

7. A cell stack device comprising
a fuel cell including a solid electrolyte and an anode provided on a surface of the solid electrolyte,
a separator including a plurality of protrusions that protrude towards the anode, and
a plurality of conductive bonding members that bond a main surface of the anode and the plurality of protrusions, wherein:
a thickness of a conductive bonding member that is positioned at a central portion of the separator and bonds the main surface of the anode is greater than a thickness of a conductive bonding member that is positioned at an outer peripheral portion of the separator and bonds the main surface of the anode, and
each of the conductive bonding members is disposed at an interval.

8. A cell stack device comprising
a fuel cell including a solid electrolyte and a cathode that is provided on one surface of the solid electrolyte,
a first separator including a plurality of first protrusions that protrude towards the cathode, and
a plurality of conductive first bonding members that bond the cathode and the plurality of first protrusions, wherein:
a thickness of a first bonding member that is positioned on a central portion is 0.3-0.9 times a thickness of a first bonding member that is positioned at an outer peripheral portion,
each of the first bonding members is disposed at an interval,
the fuel cell further includes an anode provided on another surface of the solid electrolyte and the cell stack device further comprises
a second separator including a plurality of second protrusions that protrude towards the anode,
a plurality of conductive second bonding members that bond the anode and the plurality of second protrusions, and
a thickness of a second bonding member that is positioned at an outer peripheral portion is 0.3-0.9 times a thickness of a second bonding member that is positioned at a central portion.

* * * * *